(12) United States Patent
Meakin et al.

(10) Patent No.: US 7,608,648 B2
(45) Date of Patent: Oct. 27, 2009

(54) POLYMERIC MATERIAL

(75) Inventors: Craig Meakin, Lancashire (GB); Dianne Flath, Elswick (GB); Brian Wilson, Lancashire (GB)

(73) Assignee: Victrex Manufacturing Limited, Lancashire (GB)

(*) Notice: Subject to any disclaimer, the term of this patent is extended or adjusted under 35 U.S.C. 154(b) by 395 days.

(21) Appl. No.: 11/387,748

(22) Filed: Mar. 24, 2006

(65) Prior Publication Data

US 2006/0251878 A1    Nov. 9, 2006

Related U.S. Application Data

(63) Continuation-in-part of application No. PCT/GB2004/004087, filed on Sep. 27, 2004.

(30) Foreign Application Priority Data

| Sep. 26, 2003 | (GB) | ................................ 0322598.4 |
| Apr. 6, 2005 | (GB) | ................................ 506937.2 |

(51) Int. Cl.
   *C08K 7/02*       (2006.01)
   *C08L 71/00*      (2006.01)

(52) U.S. Cl. ............................ 523/220; 524/611
(58) Field of Classification Search ............... 524/611; 523/220
   See application file for complete search history.

(56) References Cited

U.S. PATENT DOCUMENTS 4,638,037 A * 1/1987 Ward et al. .................. 525/471
5,561,202 A   10/1996 Helmer-Metzmann et al.

FOREIGN PATENT DOCUMENTS

| EP | 0 001 879 A1 | 5/1979 |
| EP | 0 125 816 A2 | 11/1984 |
| EP | 0 184 458 A2 | 6/1986 |
| WO | WO 02/096974 A2 | 12/2002 |

* cited by examiner

*Primary Examiner*—Kriellion A Sanders
(74) *Attorney, Agent, or Firm*—Nixon & Vanderhye

(57) ABSTRACT

A polyaryletherketone polymeric material, for example polyetheretherketone and composite materials comprising said polymeric material are described. The polymeric material has a melt viscosity (MV) in the range 0.05 to 0.12 $kNsm^{-2}$, preferably in the range 0.085 to 0.095 $kNsm^{-2}$.

41 Claims, No Drawings

POLYMERIC MATERIAL

This application is a continuation-in-part of PCT International Application No. PCT/GB2004/004087, filed 27 Sep. 2004, which designated the U.S. This continuation-in-part application claims priority to British Application No. 0322598.4, filed 26 Sep. 2003 and 0506937.2, filed 6 Apr. 2005. The entire content of these applications are incorporated herein by reference.

This invention relates to a polymeric material and particularly, although not exclusively, relates to a polyaryletherketone, especially to polyetheretherketone.

The thermoplastic polyaryletherketone polyetheretherketone has been known for over twenty years. EP0001879B (Imperial Chemical Industries) describes its preparation and use and states that, to be useful, polyaryletherketones must have an inherent viscosity (IV) of at least 0.7 $dlg^{-1}$ (which corresponds to a reduced viscosity (RV) of at least 0.8 $dlg^{-1}$) measured according to the method described in EP 0001879B. It is stated that, if the IV is less than 0.7 $dlg^{-1}$, polymers prepared are not tough but are brittle.

Consequently, whilst polymers of IV less than 0.7 $dlg^{-1}$ have been prepared none is commercially available and none has been used to manufacture components by, for example, injection moulding or extrusion.

For many years, Imperial Chemical Industries and its successor in title, Victrex Plc, were the sole manufacturers of polyetheretherketone. In view of the aforementioned companies' accepted understanding as regards the necessity for any useful polymer to have an IV of at least 0.7 $dlg^{-1}$, the companies' lowest viscosity polyetheretherketone made commercially available had an MV of 0.15 $kNsm^{-2}$ (Victrex PEEK (Trade mark) 150) which corresponds to an IV of 0.755 $dlg^{-1}$). The company also sells two higher viscosity materials, namely a medium viscosity grade (Victrex PEEK 380 having an MV of 0.38 $kNsm^{-2}$) and a standard viscosity grade (Victrex PEEK 450 having an MV of 0.45 $kNsm^{-2}$).

Since EP0001879B expired other companies have made polyetheretherketone. For example US6566484 B2 (Gharda Chemicals) describes the preparation of a melt processible polyetheretherketone polymer. The document describes preparation of a range of polymers having different IVs, but there is no suggestion that polymers having an IV of less than 0.7 may have any advantageous properties or commercial use. Gharda Chemicals manufactures and sells polyetheretherketones; its lowest viscosity grade is referred to as grade 5600 which is said to have Melt Flow Rate (MFR) in the range 30-40 cc/10 minutes. This grade has an IV/MV which is substantially the same as that of Victrex PEEK 150 referred to above. The company also sells Grades 5400 and 5300 which have substantially the same IV/MV as Victrex PEEK grades 380 and 450 respectively.

It appears to have been accepted for many years in the area of polyaryletherketones especially as regards polyetheretherketone (which is by far the predominant commercially available polyaryletherketone), that polymers having an IV of less than 0.7 $dlg^{-1}$ are of no commercial use. However, the present invention is based on a surprising discovery that such polymers have useful properties and that the long accepted statements in EP0001879B are inaccurate. In particular, it is believed that the test for toughness described in EP0001879B may not be an accurate predictor of the properties and/or usefulness of polyaryletherketone polymers.

It is an object of the present invention to provide polyaryletherketone polymers which have advantageous and useful properties.

According to a first aspect of the present invention, there is provided a pack comprising a polymeric material having a melt viscosity (MV) in the range 0.05 to 0.12 $kNsm^{-2}$ wherein said polymeric material is of a type which includes:
(a) phenyl moieties;
(b) carbonyl moieties; and
(c) ether moieties.

MV is suitably measured using capillary rheometry operating at 400° C. at a shear rate of $1000s^{-1}$ using a tungsten carbide die, 0.5×3.175 mm.

Although the invention is described in terms of MV this may be equated approximately to IV (measured as described in EP0001879B) in accordance with FIG. 1 hereinafter.

It has surprisingly been found that, whilst the viscosity of the polymeric material is significantly less than that of the lowest viscosity commercially available polyaryletherketone, the polymeric material has mechanical properties which are similar to commercially available Victrex PEEK 150. Advantageously, the lower viscosity may enable the polymeric material to be used in applications, for example for highly filled composite materials and/or in injection moulding or extruding components having relatively thin walls, where higher viscosity (e.g. PEEK 150) material could not be used.

Said polymeric material suitably has an MV of 0.06 $kNsm^{-2}$, preferably has an MV of at least 0.07 $kNsm^{-2}$, more preferably at least 0.08 $kNsm^{-2}$.

Said polymeric material may have an MV of less than 0.11 $kNsm^{-2}$, preferably less than 0.10 $kNsm^{-2}$.

Said polymeric material may have an MV in the range 0.07 to 0.12 $kNsm^{-2}$, preferably in the range 0.08 to 0.11 $kNsm^{-2}$, more preferably in the range 0.08 to 0.10 $kNsm^{-2}$.

Said polymeric material preferably has an MV in the range 0.07 to 0.10 $kNsm^{-2}$, more preferably in the range 0.08 to 0.10 $kNsm^{-2}$.

Said polymeric material may have a tensile strength, measured in accordance with ASTM D790 of at least 80 MPa. The tensile strength is preferably in the range 80-110 MPa, more preferably in the range 80-100 MPa.

Said polymeric material may have a flexural strength, measured in accordance with ASTM D790 of at least 145 MPa. The flexural strength is preferably in the range 145-180 MPa, more preferably in the range 145-165 MPa.

Said polymeric material may have a flexural modulus, measured in accordance with ASTM D790, of at least 3.5 GPa. The flexural modulus is preferably in the range 3.5-4.5 GPa, more preferably in the range 3.5-4.1 GPa.

Said pack may include at least 1 kg, suitably at least 5 kg, preferably at least 10 kg, more preferably at least 14 kg of material of which at least a part is made up of a said polymeric material. Said pack may include 1000 kg or less, preferably 500 kg or less of said material. Preferred packs include 10 to 500 kg of said material.

Said pack may include a composite material as described hereinafter which includes a said polymeric material.

Said pack may include at least 1 kg, suitably at least 5 kg, preferably at least 10 kg, more preferably at least 14 kg of a said polymeric material as described. Said pack may include 1000 kg or less, preferably 500 kg or less of said polymeric material. Preferred packs include 10 to 500 kg of a said polymeric material.

Material in said pack (e.g. a composite material or a said polymeric material per se) may be in powder or granular form.

Said pack may comprise packaging material (which is intended to be discarded or re-used) and a desired material (e.g. a composite material and/or a said polymeric material).

Said packaging material preferably substantially fully encloses said desired material. Said packaging material may comprise a first receptacle, for example a flexible receptacle such as a plastics bag in which said desired material is arranged. The first receptacle may be contained within a second receptacle for example in a box such as a cardboard box.

Said desired material in said pack may comprise at least 90 wt % of a said polymeric material and preferably consists essentially of a said polymeric material.

Preferably, said polymeric material has a moiety of formula

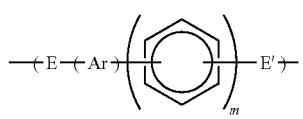

I and/or a moiety of formula

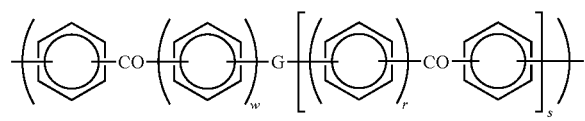

II wherein m, r, s and w independently represent zero or a positive integer, E and E' independently represent an oxygen atom or a direct link, G represents an oxygen atom, a direct link or a —O—Ph—O— moiety where Ph represents a phenyl group and Ar is selected from one of the following moieties (i) to (vi) which is bonded via one or more of its phenyl moieties to adjacent moieties

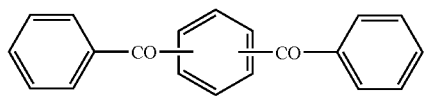

(i)

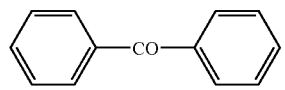

(ii)

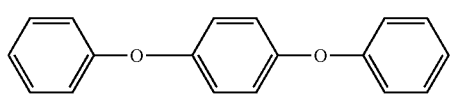

(iii)

(iv)

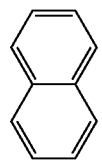

(v)

(vi)

Unless otherwise stated in this specification, a phenyl moiety has 1,4-, linkages to moieties to which it is bonded.

In (i), the middle phenyl may be 1,4- or 1,3-substituted.

Said polymeric material may include more than one different type of repeat unit of formula I; and more than one different type of repeat unit of formula II. Preferably, however, only one type of repeat unit of formula I or II is provided.

Said moieties I and II are suitably repeat units. In the polymeric material, units I and II are suitably bonded to one another—that is, with no other atoms or groups being bonded between units I and II.

Where w is greater than zero, the respective phenylene moieties may independently have 1,4- or 1,3-linkages to the other moieties in the repeat units of formulae II. Preferably, said phenylene moieties have 1,4-linkages.

Suitably, "a" represents the mole % of units of formula I in said polymeric material, suitably wherein each unit I is the same; and "b" represents the mole % of units of formula II in said polymeric material, suitably wherein each unit II is the same. Preferably, a is in the range 45-100, more preferably in the range 45-55, especially in the range 48-52. Preferably, b is in the range 0-55, more preferably in the range 45-55, especially in the range 48-52. Preferably, the ratio of a to b is in the range 0.9 to 1.1 and, more preferably, is about 1. Suitably, the sum of a and b is at least 90, preferably at least 95, more preferably at least 99, especially about 100. Preferably, said polymeric material consists essentially of moieties I and II.

Said polymeric material may be a homopolymer having a repeat unit of general formula

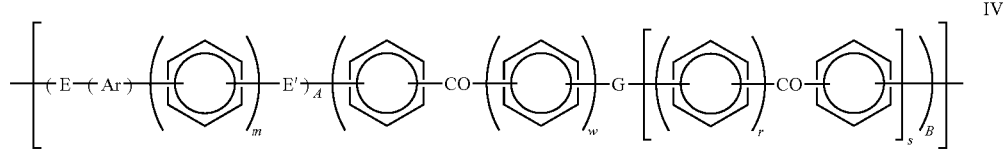

IV or a random or block copolymer of at least two different units of IV, wherein A and B independently represent 0 or 1 and E, E', G, Ar, m, r, s and w are as described in any statement herein.

As an alternative to a polymeric material comprising unit(s) IV discussed above, said polymeric material may be a homopolymer having a repeat unit of general formula

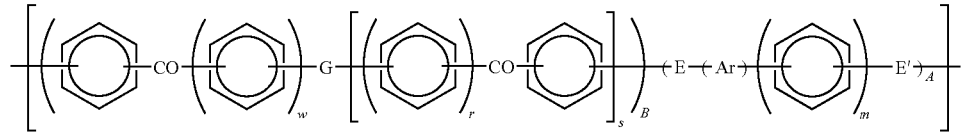
IV* or a random or block copolymer of at least two different units of IV* wherein A and B, independently represent 0 or 1 and E, E', G, Ar, m, r, s and w are as described in any statement herein.

Preferably, m is in the range 0-3, more preferably 0-2, especially 0-1. Preferably, r is in the range 0-3, more preferably 0-2, especially 0-1. Preferably, s is 0 or 1. Preferably, w is 0 or 1.

Preferably, said polymeric material is a homopolymer having a repeat unit of general formula IV.

Preferably Ar is selected from the following moieties (vii) to (xiii):

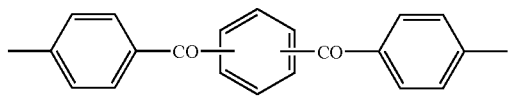
(vii)

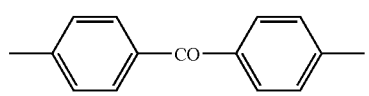
(viii)

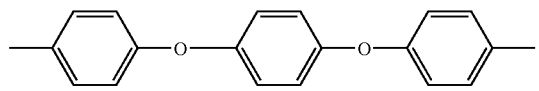
(ix)

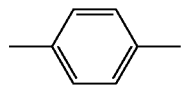
(x)

(xi)

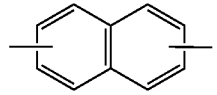
(xii)

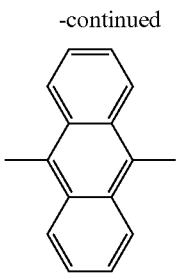
(xiii)

In (vii), the middle phenyl may be 1,4- or 1,3-substituted.

Preferably, (xi) is selected from a 1,2-, 1,3-, or a 1,5- moiety; and (xii) is selected from a 1,6-, 2,3-, 2,6- or a 2,7- moiety.

Suitable moieties Ar are moieties (i), (ii), (iii) and (iv) and, of these, moieties (i), (ii) and (iv) are preferred. Other preferred moieties Ar are moieties (vii), (viii), (ix) and (x) and, of these, moieties (vii), (viii) and (x) are especially preferred.

An especially preferred class of polymeric material are polymers (or copolymers) which consist essentially of phenyl moieties in conjunction with ketone and/or ether moieties. That is, in the preferred class, the polymeric material does not include repeat units which include —S—, —SO$_2$— or aromatic groups other than phenyl. Preferred polymeric materials of the type described include:

(a) a polymer consisting essentially of units of formula IV wherein Ar represents moiety (iv), E and E' represent oxygen atoms, m represents 0, w represents 1, G represents a direct link, s represents 0, and A and B represent 1 (i.e. polyetheretherketone).

(b) a polymer consisting essentially of units of formula IV wherein E represents an oxygen atom, E' represents a direct link, Ar represents a moiety of structure (i), m represents 0, A represents 1, B represents 0 (i.e. polyetherketone);

(c) a polymer consisting essentially of units of formula IV wherein E represents an oxygen atom, Ar represents moiety (i), m represents 0, E' represents a direct link, A represents 1, B represents 0, (i.e. polyetherketoneketone).

(d) a polymer consisting essentially of units of formula IV wherein Ar represents moiety (i), E and E' represent oxygen atoms, G represents a direct link, m represents 0, w represents 1, r represents 0, s represents 1 and A and B represent 1. (i.e. polyetherketoneetherketoneketone).

(e) a polymer consisting essentially of units of formula IV, wherein Ar represents moiety (iv), E and E' represents oxygen atoms, G represents a direct link, m represents 0, w represents 0, s, r, A and B represent 1 (i.e. polyetheretherketoneketone).

(f) a polymer comprising units of formula IV, wherein Ar represents moiety (iv), E and E' represent oxygen atoms, m represents 1, w represents 1, A represents 1, B represents 1, r and s represent 0 and G represents a direct link (i.e. polyether-diphenyl-ether-phenyl-ketone-phenyl-).

Said polymeric material is preferably semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calerimetry (DSC).

The level of crystallinity in said polymeric material may be at least 1%, suitably at least 3%, preferably at least 5% and more preferably at least 10%. In especially preferred embodiments, the crystallinity may be greater than 30%, more preferably greater than 40%, especially greater than 45%.

The glass transition temperature ($T_g$) of said polymeric material may be at least 140° C., suitably at least 144° C. In some cases it may be greater than 154° C., 160° C., 164° C., 170° C., 190° C. or greater than 250° C. or even 300° C. In a preferred embodiment, the glass transition temperature is in the range 140° C. to 145° C.

The main peak of the melting endotherm (Tm) for said polymeric material (if crystalline) may be at least 300° C.

Said polymeric material may consist essentially of one of units (a) to (f) defined above. Alternatively, said polymeric material may comprise a copolymer comprising at least two units selected from (a) to (f) defined above. Preferred copolymers include units (a). For example, a copolymer may comprise units (a) and (f); or may comprise units (a) and (e).

In preferred embodiments, said polymeric material is selected from polyetheretherketone and polyetherketone. In an especially preferred embodiment, said polymeric material is polyetheretherketone.

In a preferred embodiment said pack comprises polyetheretherketone having an MV in the range 0.07 to 0.12 $kNsm^{-2}$, preferably in the range 0.08 to 0.11 $kNsm^{-2}$, especially in the range 0.08 to 0.10 $kNsm^{-2}$.

According to a second aspect of the invention, there is provided a receptacle containing at least 1 kg (preferably at least 5 kg, more preferably at least 50 kg) of a said polymeric material as described according to said first aspect.

The polymeric material described may enable highly filled composite materials to be prepared in view of its relatively low viscosity. Thus, according to a third aspect of the present invention, there is provided a composite material which comprises a polymeric material having an MV in the range 0.05 to 0.12 $kNsm^{-2}$ (preferably in the range 0.07 to 0.10 $kNsm^{-2}$, more preferably in the range 0.08 to 0.10 $kNsm^{-2}$) and a filler means, wherein said polymeric material is of a type which includes:

(a) phenyl moieties;
(b) carbonyl moieties; and
(c) ether moieties.

Said polymeric material may have any feature of said polymeric material described according to said first aspect. Said polymeric material is preferably polyetheretherketone.

Said filler means may include a fibrous filler or a non-fibrous filler. Said filler means may include both a fibrous filler and a non-fibrous filler.

A said fibrous filler may be continuous or discontinuous.

In preferred embodiments a said fibrous filler is discontinuous.

Preferably, fibres of a filler means which is discontinuous have an average length of less than 10 mm, preferably less than 7 mm.

A said fibrous filler may be selected from inorganic fibrous materials, high-melting organic fibrous materials and carbon fibre.

A said fibrous filler may be selected from inorganic fibrous materials, non-melting and high-melting organic fibrous materials, such as aramid fibres, and carbon fibre.

A said fibrous filler may be selected from glass fiber, carbon fibre, asbestos fiber, silica fiber, alumina fiber, zirconia fiber, boron nitride fiber, silicon nitride fiber, boron fiber, fluorocarbon resin fibre and potassium titanate fiber. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin and barium sulfate. The list of non-fibrous fillers may further include graphite, carbon powder and nanotubes. The non-fibrous fillers may be introduced in the form of powder or flaky particles.

Preferably said filler means comprises one or more fillers selected from glass fibre, carbon fibre, carbon black and a fluorocarbon resin. Said fillers are preferably discontinuous and may comprise chopped fibres.

Said composite material may comprise one or more polymeric material(s) of a type described above with MV as described. Preferably, said composite material comprises only a single type of polymeric material. Said single type is preferably polyetheretherketone.

Said composite material suitably includes 30 to 80 wt % of polymeric material(s) of the type described, (which is preferably a single type of polymeric material, especially polyetheretherketone) and 20 to 70 wt % of filler means. Preferably, said composite material comprises 30 to 70 wt % of polymeric material and 30 to 70 wt % of filler means. More preferably, said composite material comprises 40 to 65 wt % of polymeric material and 35 to 60 wt % of filler means. In an especially preferred embodiment, said composite material comprises 40 to 60 wt % of polymeric material and 40 to 60 wt % of filler means.

The ratio of the wt % of polymeric material to the wt % of filler means may be in the range 0.6 to 1.6, preferably 0.65 to 1.5.

The ratio of the wt % of filler means to the wt % of polymeric material is preferably at least 0.65, more preferably at least 0.8, especially at least 1.

Said composite material may be in granular form.

According to a fourth aspect of the invention there is provided a method of making a composite material the method comprising:

(i) selecting a polymeric material having an MV in the range 0.05 to 0.12 $kNsm^{-2}$ (preferably in the range 0.07 to 0.10 $kNsm^{-2}$, more preferably in the range 0.08 to 0.10 $kNsm^{-2}$), wherein said polymeric material is of a type which includes:

(a) phenyl moieties;
(b) carbonyl moieties; and
(c) ether moieties;

AND (ii) contacting said polymeric material with a filler means to prepare said composite material.

Said polymeric material selected may have any feature of said polymeric material described herein. Said polymeric material is preferably polyetheretherketone.

Said filler means and the composite material prepared may independently have any features of the filler means and composite material described herein.

Preferably, said filler means comprises one or more fillers selected from glass fibre, carbon fibre, carbon black and a fluorocarbon resin. More preferably, said filler means comprises glass fibre or carbon, especially discontinuous, for example chopped, glass fibre or carbon fibre. Preferred discontinuous fibres have an average length before contact with the polymeric material, of less than 10 mm, preferably less than 7 mm. The average length may be greater than 1 mm, preferably greater than 2 mm. Preferably, a fibrous filler means consists essentially of fibers having a length, before contact with the polymeric material, of less than 10 mm.

Said composite material may be prepared as described in PCT/GB2003/001872 and the content of the aforementioned document is incorporated herein by reference.

Said composite material may be prepared by contacting melted polymeric material with said filler means.

As described above, the polymeric material may advantageously be used in injection moulding or extrusion to manufacture components. Thus, according to a fifth aspect of the invention, there is provided a method of making a component, the method comprising extruding or injection moulding a polymeric material having an MV in the range 0.05 to 0.12 $kNsm^{-2}$ (preferably in the range 0.07 to 0.10 $kNsm^{-2}$, more preferably in the range 0.08 to 0.10 $kNsm^{-2}$), wherein said polymeric material is of a type which includes:

(a) phenyl moieties;
(b) carbonyl moieties; and
(c) ether moieties.

Said polymeric material may have any feature of said polymeric material described according to any of the above aspects. Said polymeric material is preferably polyetheretherketone.

Said method preferably involves selecting a precursor material from which to make the component wherein said precursor material comprises a said polymeric material and subjecting the precursor material to a temperature above its melting temperature in an extrusion or injection moulding apparatus. Suitably, said precursor material is heated to a temperature of greater than 300° C., preferably greater than 340° C. It is suitably heated to a temperature not exceeding 450° C.

Said precursor material may consist essentially of a said polymeric material described herein or a said composite material described herein.

Suitably, in the method, at least 0.5 g, preferably at least 1 g, more preferably at least 5 g, especially at least 10 g is selected in order to make the component.

The method may be used to make components having relatively thin walls. Thus, the invention, in a sixth aspect relates to a method of making a component which has a wall which includes a region having a thickness of 3 mm or less, the method comprising:

(A) selecting a precursor material which comprises a polymeric material having an MV in the range 0.05 to 0.12 $kNsm^{-2}$ (preferably in the range 0.07 to 0.10 $kNsm^{-2}$), more preferably in the range 0.08 to 0.10 $kNsm^{-2}$), wherein said polymeric material is of a type which includes:

(a) phenyl moieties;
(b) carbonyl moieties; and
(c) ether moieties;

AND (B) treating said precursor material, thereby to form said component.

Preferably, the component includes a region having a thickness of 2 mm or less, more preferably 1 mm or less.

Said treatment described in (B) preferably involves melt processing said precursor material. Melt processing is preferably carried out by extrusion or injection moulding.

Suitably, said component includes a region having an area of at least 0.5 $cm^2$, preferably at least 1 $cm^2$, more preferably at least 5 $cm^2$ having a thickness as described. Thus, in one embodiment, said component may include a region of at least 0.5 $cm^2$ which has a thickness of 3 mm, preferably of 2 mm or less.

A said polymeric material as described herein may be made by any suitable method. An electrophilic process may be used as described in US6566484B2; or a nucleophilic process may be used as described in EP00001879B or PCT/GB99/02833. A nucleophilic process is preferred.

MV may be controlled as described in EP 0001879B.

Any features of any aspect of any invention or embodiment described herein may be combined with any feature of any aspect of any other invention or embodiment described herein mutatis mutandis.

Specific embodiments of the invention will now be described by way of example, with reference to the accompanying figure which is a plot illustrating the relationship between MV and IV.

VICTREX PEEK 150P (Trade Mark), Victrex PEEK 150GL30 (Trade Mark) and Victrex PEEK 150CA130 may be obtained from Victrex Plc, UK.

All chemicals referred to herein were used as received from Sigma-Aldrich Chemical Company, Dorset, UK, unless otherwise stated.

EXAMPLE 1

Preparation of Polyetheretherketone

A 250 ml flanged flask fitted with a ground glass Quickfit lid, stirrer/stirrer guide, nitrogen inlet and outlet was charged with 4,4'-difluorobenzophenone (22.48 g, 0.103 mole), hydroquinone (11.01 g, 0.1 mole) and diphenylsulphone (49 g) and purged with nitrogen for over 1 hour. The contents were then heated under a nitrogen blanket to between 140 and 150° C. to form an almost colourless solution. While maintaining a nitrogen blanket, dried sodium carbonate (10.61 g, 0.1 mole) and potassium carbonate (0.278 g, 0.002 mole) was added. The temperature was raised to 200° C. and held for 1 hour; raised to 250° C. and held for 1 hour; raised to 315° C. and maintained for 2 hour.

The reaction mixture was allowed to cool, milled and washed with acetone and water. The resulting polymer was dried in an air oven at 120° C. producing a powder. The polymer had a melt viscosity at 400° C., 1000$sec^{-1}$ of 0.089 $kNsm^{-2}$.

The polymer was compression moulded at 400° C. in a press (20 tonnes, 5 minutes) into a thin film approximately 0.2 mm thick and cooled from 400° C. to 120° C. in 30 minutes to induce complete crystallisation and then allowed to cool to room temperature.

The film was then hinged through 180° followed by hinging through 360° C. This process was repeated 5 times and the film survived without breaking and was therefore considered to be tough.

EXAMPLE 2a-d

Preparation of Samples of Polyetheretherketone with Different Melt Viscosities

The procedure described in Example 1 was repeated except the polymerisation time was varied to produce polyetheretherketone with different melt viscosities. The details are given in Table 1 below.

TABLE 1

| Example | Reaction Time (mins) | Melt Viscosity (kNsm$^{-2}$) | Toughness Test |
|---|---|---|---|
| 1 | 120 | 0.089 | Tough |
| 2a | 180 | 0.150 | Tough |
| 2b | 160 | 0.117 | Tough |
| 2c | 90 | 0.075 | Brittle |
| 2d | 60 | 0.06 | Brittle |

EXAMPLE 3

Large Scale Production of Polyetheretherketone

The procedure described in Example 1 was repeated on a larger scale to produce sufficient material to carry out mechanical and melt flow testing. Five batches were produced, Examples 3a-e, with Melt Viscosities measured at 400° C. and 1000s$^{-1}$ of 0.144, 0.110 0.089, 0.076 and 0.059 kNsm$^{-2}$ respectively.

EXAMPLE 4a-d

Melt Flow Index of Polyetheretherketones

The Melt Flow Index of the polyetheretherketone samples from Examples 3c,3e, a sample of Victrex PEEK 150P and blends of Examples 3d and 3a in a weight ratio of 77:23 and Examples 3e and 3a in a weight ratio of 64:36 were measured on a CEAST Melt Flow Tester 6941.000. The polymer was placed in the barrel of the Melt Flow Tester apparatus and heated to 400° C. The polymer was then extruded under a constant shear stress by inserting a weighted piston (2.16 kg) into the barrel and extruding through a tungsten carbide die, 2.095 mmbore×8.000 mm. The MFI (Melt Flow Index) is the average mass of polymer (in g) extruded in 10 min. The results are detailed in Table 2 below.

TABLE 2

| Example | Polyetheretherketone Sample | Melt Viscosity (kNsm$^{-2}$) | Melt Flow Index (g/10 mins) |
|---|---|---|---|
| 4a | Example 3c | 0.089 | 87 |
| 4b | Example 3e | 0.059 | 117 |
| 4c | Example 3d (77 wt %) + Example 3a (23 wt %) | 0.09 | 83 |
| 4d | Example 3e (64 wt %) + Example 3a (36 wt %) | 0.09 | 78 |
| 4e | Victrex PEEK 150P | 0.150 | 41 |

EXAMPLE 5

Spiral Flow of Low Viscosity Polyetheretherketones

Spiral flow measurements were made on a spiral flow mould at a melt temperature of 370 and 390° C. and 1 and 2 mm mould depth at a mould temperature of 185° C. with an injection pressure of 140 Bar and the flow length determined. The results are detailed in Table 3 below.

TABLE 3

| Example | Polyetheretherketone Sample | Mould Temperature (° C.) | Mould Depth | Flow Length (mm) |
|---|---|---|---|---|
| 5a | Ex3e (64 wt %) + Ex3a (36 wt %) | 370 | 1 mm | 302 |
| 5b | Victrex PEEK 150P | 370 | 1 mm | 239 |
| 5c | Ex3e (64 wt %) + Ex3a (36 wt %) | 370 | 2 mm | 834 |
| 5d | Victrex PEEK 150P | 370 | 2 mm | 514 |
| 5e | Ex3e (64 wt %) + Ex3a (36 wt %) | 390 | 1 mm | 315 |
| 5f | Victrex PEEK 150P | 390 | 1 mm | 263 |
| 5g | Ex3e (64 wt %) + Ex3a (36 wt %) | 390 | 2 mm | >1000 |
| 5h | Victrex PEEK 150P | 390 | 2 mm | 727 |

EXAMPLES 6a-e

Mechanical Properties of Low Viscosity Polyetheretherketones

Samples of polyetheretherketone from Examples 3c, 3d, 3e, Victrex PEEK 150P, the 60:40 wt % blend of Example 3d and 3b the 30:30:30:10 wt % blend of Examples 3b, 3c, 3d and 3e, the 77:23 wt % blend of Example 3d and 3a and the 64:36 wt % blend of Example 3e and 3a were injection moulded using a barrel temperature of 350-360° C., nozzle temperature 365° C., mould temperature 145-155° C., holding pressure 30 Bar, injection pressure of 140 Bar and a screw speed of 45 rpm to produce standard test pieces for mechanical property evaluation. The results are detailed in Table 4 below.

TABLE 4

| Example | Polyetheretherketone Sample | Melt Viscosity (kNsm$^{-2}$) | Tensile Strength (MPa)[a] | Flexural Strength (MPa)[b] | Flexural Modulus (GPa)[b] |
|---|---|---|---|---|---|
| 6a | Example 3c | 0.089 | 90.0 | 157.9 | 4.0 |
| 6b | Example 3d | 0.076 | 98.1 | 149.8 | 3.7 |
| 6c | Example 3b (40 wt %) + Example 3d (60 wt %) | 0.09 | | 154.6 | 4.1 |
| 6d | Example 3e | 0.059 | 100.6 | 149.2 | 3.7 |
| 6e | Ex3b (30 wt %) + Ex3c (30 wt %) + Ex3d (30 wt %) + Ex3e (10 wt %)+ | 0.092 | 107.6 | 154.6 | 4.0 |
| 6f | Example 3d (77 wt %) + Example 3a (23 wt %) | 0.09 | 98.3 | 147.7 | 3.7 |
| 6g | Example 3e (64 wt %) + Example 3a (36 wt %) | 0.09 | 97.8 | 149.0 | 3.7 |
| 6h | Victrex PEEK 150P | 0.150 | 98.5 | 149.1 | 3.9 |

[a]ASTM D638
[b]ASTM D790

EXAMPLE 7a-d

Melt Flow Index and Mechanical Properties of Filled, Low Viscosity Polyetheretherketones The polyetheretherketone from the 64:36 wt % blend of Example 3e and 3a was compounded separately with 30 wt % glass fibre (Owens Corning OCP CS D165-11C) and 30 wt % carbon fibre (SGL Sigrafil C25 S006 APS) on a ZSK 25 WLE Twin Screw Extruder, Examples 7a and 7c respectively. The Melt Flow Index of the two compounds at 400° C. and 2.16 kg was determined and compared to Victrex PEEK 150GL30 and 150CA30 which are commercial grades of polyetheretherketone containing 30 wt % glass fibre and carbon fibre respectively. The results are detailed in Table 5 below.

Compounds Example 7a and 7d were injection moulded using a barrel temperature of 370-380° C., nozzle temperature 380° C., mould temperature 180-200° C., holding pressure 30 Bar, injection pressure 140 Bar and a screw speed of 45 rpm into standard test pieces and their mechanical properties determined and compared to those of to Victrex PEEK 150GL30 and 150CA30. The results are detailed in Table 5 below.

TABLE 5

| Example | Polyetheretherketone Sample | Melt Flow Index (g/10 min) | Tensile Strength (MPa)[a] | Flexural Strength (MPa)[b] | Flexural Modulus (GPa)[b] |
|---|---|---|---|---|---|
| 7a | Blend [3e(64 wt %) + 3a(36 wt %)](70 wt %) + Glass Fibre (30 wt %) | 30 | 155.8 | 242.1 | 10.2 |
| 7b | Victrex PEEK 150GL30 | 14 | 163.5 | 252.5 | 10.0 |
| 7c | Blend [3e(64 wt %) + 3a(36 wt %)](70 wt %) + Carbon Fibre (30 wt %) | 30 | 202.4 | 304.5 | 16.9 |
| 7d | Victrex PEEK 150CA30 | 12 | 208.6 | 312.7 | 18.7 |

[a] ASTM D638
[b] ASTM D790

EXAMPLE 8a-g

Melt Flow Index and Mechanical Properties of Highly Filled, Low Viscosity Polyetheretherketones The polyetheretherketone from the 64:36 wt % blend of Example 3e and 3a was compounded separately with 40 wt %, 50 wt %, 60 wt % and 70 wt % glass fibre (Owens Corning OCF D165A-11C) and 40 wt %, 50 wt % and 60 wt % carbon fibre (SGL Sigrafil C25 S006 APS) on a ZSK 25 WLE Twin Screw Extruder, Examples 8a-8g respectively. The Melt Flow Index of the compounds at 400° C. and 2.16 kg was determined and compared to Victrex PEEK™ 150GL30 and 150CA30 which are commercial grades of polyetherkeone containing 30 wt % glass fibre and carbon fibre respectively. The results are detailed in Tables 6a and 6b below.

Compounds Example 8a-8g were injection moulded using a barrel temperature of 370-380° C., nozzle temperature 380° C., mould temperature 180-200° C., holding pressure 30 Bar and a screw speed of 45 rpm into standard test pieces and their mechanical properties determined and compared to those of Victrex PEEK 150GL30 and 150CA30. The results are detailed in Table 6a and 6b below.

TABLE 6a

| Example | Polyetheretherketone Sample (% wt)[a] | Glass Fibre (wt %) | Melt Flow Index (g/10 min) | Tensile Strength (MPa)[b] | Flexural Strength (MPa)[c] | Flexural Modulus (GPa)[c] | Notched Izod (kJ/m²)[d] |
|---|---|---|---|---|---|---|---|
| 8a | 60 | 40 | 26.9 | 211 | 314 | 13.7 | 12.6 |
| 8b | 50 | 50 | 17.9 | 228 | 327 | 17.4 | 13.4 |
| 8c | 40 | 60 | 11.9 | 227 | 342 | 21.8 | 12.5 |
| 8d | 30 | 70 | 7.8 | 198 | 320 | 26.0 | 8.9 |
| Victrex PEEK 150GL30 | | | 14 | 163.5 | 252.5 | 10.0 | 8.8 |

[a] Polyetheretherketone sample Blend 3e(64 wt %) + 3a(36 wt %)
[b] ISO 527
[c] ISO 178-1993(E)
[d] ISO 180

TABLE 6b

| Example | Polyetheretherketone Sample (% wt)[a] | Carbon Fibre (wt %) | Melt Flow Index (g/10 min) | Tensile Strength (MPa)[b] | Flexural Strength (MPa)[c] | Flexural Modulus (GPa)[c] | Notched Izod (kJ/m²)[d] |
|---|---|---|---|---|---|---|---|
| 8e | 60 | 40 | 17 | 229 | 338 | 25.1 | 7.8 |
| 8f | 50 | 50 | 6.5 | 229 | 354 | 31.3 | 6.8 |
| 8g | 40 | 60 | 4.8 | 221 | 357 | 36.8 | 6.3 |
| Victrex PEEK 150CA30 | | | 12 | 208.6 | 312.7 | 18.7 | 7.9 |

[a] Polyetheretherketone sample Blend 3e(64 wt %) + 3a(36 wt %)
[b] ISO 527
[c] ISO 178-1993(E)
[d] ISO 180

EXAMPLE 9a-b

Melt Flow Index and Mechanical Properties of Mica Filled, Low Viscosity Polyetheretherketones The polyetheretherketones from the 64:36 wt % blend of Examples 3e and 3a, and Victrex 150P were compounded with 30 wt % mica (CMMP, micronised mica 325 mesh) on a ZSK 25 WLE Twin Screw Extruder, Examples 9a-9b respectively. The Melt Flow Index of the compounds at 400° C. and 2.16 kg was determined. The results are detailed in Table 7 below.

Compounds Example 9a-9b were injection moulded using a barrel temperature of 370-380° C., nozzle temperature 380° C., mould temperature 180-200° C., holding pressure 30 Bar and a screw speed of 45 rpm into standard test pieces and their mechanical properties determined The results are detailed in Table 7.

TABLE 7

| Example | Polyetheretherketone Sample (% wt) | Mica (wt %) | Melt Flow Index (g/10 min) | Tensile Strength (MPa)[c] | Flexural Strength (MPa)[d] | Flexural Modulus (GPa)[d] | Notched Izod (kJ/m$^2$)[e] |
|---|---|---|---|---|---|---|---|
| 9a | 70[a] | 30 | 61.2 | 84 | 139 | 7.5 | 2.9 |
| 9b | 70[b] | 30 | 25.1 | 85 | 152 | 7.3 | 3.2 |

[a]Polyetheretherketone sample Blend 3e(64 wt %) + 3a(36 wt %)
[b]Victrex PEEK 150P
[c]ISO 527
[d]ISO 178-1993(E)
[e]ISO 180

EXAMPLE 10a-10b

Melt Flow Index and Mechanical Properties of Highly Filled, Low Viscosity Polyetheretherketones The polyetheretherketones from the 64:36 wt % blend of Example 3e and 3a, and Victrex 150P were compounded with 15 wt % carbon fibre (SGL Sigrafil C25 S006), 15 wt % polytetrafluoroethylene (PTFE) (Asahi Glass Fluoropolymers Fluon FL 1650) and 21 wt % polyethersulphone (PES) (BASF Ultrason E3010) on a ZSK 25 WLE Twin Screw Extruder, Examples 10a-10b respectively. The Melt Flow Index of the compounds at 400° C. and 10 kg was determined. The results are detailed in Table 8a.

TABLE 8a

| Example | Polyetheretherketone Sample (% wt) | PES (wt %) | Carbon Fibre (wt) | PTFE (wt %) | Melt Flow Index (g/10 min) |
|---|---|---|---|---|---|
| 10a | 49[a] | 21 | 15 | 15 | 125.3 |
| 10b | 49[b] | 21 | 15 | 15 | 58.5 |

[a]Polyetheretherketone sample Blend 3e(64 wt %) + 3a(36 wt %)
[b]Victrex PEEK 150P
[c]ISO 527
[d]ISO 178-1993(E)
[e]ISO 180

Compounds Example 10a-10b were injection moulded using a barrel temperature of 370-380° C., nozzle temperature 380° C., mould temperature 180-200° C., holding pressure 30 Bar and a screw speed of 45 rpm into standard test pieces and their mechanical properties determined. The results are detailed in Table 8b.

TABLE 8b

| Example | Polyetheretherketone Sample (% wt) | PES (wt %) | Carbon Fibre (wt) | PTFE (wt %) | Tensile Strength (MPa)[c] | Flexural Strength (MPa)[d] | Flexural Modulus (GPa)[d] | Notched Izod (kJ/m$^2$)[e] |
|---|---|---|---|---|---|---|---|---|
| 10a | 49[a] | 21 | 15 | 15 | 152 | 217 | 9.8 | 4.4 |
| 10b | 49[b] | 21 | 15 | 15 | 158 | 239 | 11.0 | 5.5 |

[a]Polyetheretherketone sample Blend 3e(64 wt %) + 3a(36 wt %)
[b]Victrex PEEK 150P
[c]ISO 527
[d]ISO 178-1993(E)
[e]ISO 180

EXAMPLE 11

Preparation of Polyetherketone

A 250 ml flanged flask fitted with a ground glass Quickfit lid, stirrer/stirrer guide, nitrogen inlet and outlet was charged with 4,4'-difluorobenzophenone (33.49 g, 0.153 mole), 4,4'-dihydroxybenzophenone (32.13 g, 0.150 mole) and diphenylsulphone (124.5 g) and purged with nitrogen for over 1 hour. The contents were then heated under a nitrogen blanket to 160° C. to form an almost colourless solution. While maintaining a nitrogen blanket, dried sodium carbonate (16.59 g, 0.156 mole) was added. The temperature was raised to 340° C. at 1° C./min and held for 2 hour.

The reaction mixture was allowed to cool, milled and washed with acetone and water. The resulting polymer was dried in an air oven at 120° C. producing a powder. The polymer had a melt viscosity at 400° C., 1000sec$^{-1}$ of 0.12 kNsm$^{-2}$.

EXAMPLE 12a-12d

Large Scale Production of Polyetherketone

The procedure described in Example 11 was repeated on a larger scale to produce sufficient material to carry out mechanical and melt flow testing. Four batches were produced, Examples 12a-d, with Melt Viscosities measured at 400° C. and 1000s$^{-1}$ of 0.12, 0.10 0.09 and 0.08kNsm$^{-2}$ respectively.

EXAMPLE 13a-13b

Melt Flow Index of Polyetherketone

The Melt Flow Index at 400° C. and 2.16 kg for the polyetherketone sample from Example 12c and a sample of Victrex PEK P22 were measured. The results are detailed in Table 9 below.

TABLE 9

| Example | Polyetherketone Sample | Melt Viscosity (kNsm$^{-2}$) | Melt Flow Index (g/10 mins) |
|---|---|---|---|
| 13a | Example 12c | 0.09 | 140 |
| 13b | Victrex PEK P22 | 0.21 | 30 |

EXAMPLES 14a-14e

Mechanical Properties of Low Viscosity Polyetherketones

Samples of polyetherketones from Examples 12a, 12b, 12c, 12d and Victrex PEK 22P were injection moulded using a barrel temperature of 380-390° C., nozzle temperature 385° C., mould temperature 155-165° C., holding pressure 30 Bar, injection pressure of 140 Bar and a screw speed of 45 rpm to produce standard test pieces for mechanical property evaluation. The results are detailed in Table 10 below.

TABLE 10

| Example | Polyetherketone Sample | Melt Viscosity (kNsm$^{-2}$) | Tensile Strength (MPa)[a] | Flexural Strength (MPa)[b] | Flexural Modulus (GPa)[b] |
|---|---|---|---|---|---|
| 14a | Example 12a | 0.12 | 110 | 184 | 4.6 |
| 14b | Example 12b | 0.10 | 111 | 183 | 4.6 |
| 14c | Example 12c | 0.09 | 114 | 186 | 4.6 |
| 14d | Example 12d | 0.08 | 112 | 184 | 4.5 |
| 14e | Victrex PEK 22P | 0.21 | 104 | 175 | 4.2 |

[a]ASTM D638
[b]ASTM D790

EXAMPLE 15a-15b

Melt Flow Index and Mechanical Properties of Filled, Low Viscosity Polyetherketones The polyetherketone from Example 12c and Victrex PEK P22 were compounded with 30 wt % glass fibre (Owens Corning OCF CS D165A-11C) on a ZSK 25 WLE Twin Screw Extruder, Examples 15a-15b respectively. The Melt Flow Index of the compounds at 400° C. and 2.16 kg was determined. The results are detailed in Table 11 below.

Compounds Example 15a-15b were injection moulded using a barrel temperature of 375-410° C., nozzle temperature 390° C., mould temperature 180-200° C., holding pressure 30 Bar and a screw speed of 45 rpm into standard test pieces and their mechanical properties determined. The results are detailed in Table 11 below.

TABLE 11

| Example | Polyetherketone Sample | Glass Fibre (% wt) | Melt Flow Index (g/10 min) | Tensile Strength (MPa)[c] | Flexural Strength (MPa)[d] | Flexural Modulus (GPa)[d] | Notched Izod (kJ/m$^2$)[e] |
|---|---|---|---|---|---|---|---|
| 8a | | 70[a] | 30 | 42 | 187 | 261 | 11.0 | 8.9 |
| 8b | | 70[b] | 30 | 12 | 175 | 278 | 10.0 | 10.4 |

[a]Polyetherketone Example 12c
[b]Victrex PEK P22
[c]ISO 527
[d]ISO 178-1993(E)
[e]ISO 180

EXAMPLE 16a-16i

Viscosity and Mechanical Properties of Highly Filled, Low Viscosity Polyetheretherketones The polyetheretherketone from the 64:36 wt % blend of Example 3e and 3a was compounded with 0, 3, 6, 9 and 12% of a liquid crystal polymer (LCP) polymer (Ticona T130, melt point 370° C., glass content 30%), and with additional glass fibre (Owens Corning D165-11C) to obtain total glass content 60%, on a ZSK 25 WLE Twin Screw Extruder, Examples 16a-16e respectively. The LCP polymer was predried 16 hours at 150° C. before compounding.

The addition of LCP T130 was observed to decrease the extruder torque and to improve fibre wet out.

Comparative trials were carried out with Victrex 150P polyketone compounded with 0, 5, 10 and 15% of LCP T130 and with additional glass fibre to make the total glass content 30%; Examples 16f-16i respectively.

The Melt Viscosity of the compounds was determined at 380° C. and 1000 s$^{-1}$, and the Melt Flow Index at 380° C. and 2.16 kg.

Compounds Example 16a-i were injection moulded using a barrel temperature of 350-360° C., nozzle temperature 365° C., mould temperature 145-155° C., holding pressure 30 Bar and a screw speed of 45 rpm into standard test pieces and their mechanical properties determined. The results are detailed in Tables 12a and 12b below.

TABLE 12a

| Example | PEEK (wt %) | LCP T130 (wt %) | Glass Fibre (wt %) | LCP in recipe, pphr | ZSK 25 torque % | Melt Flow Index, 380° C. (g/10 min) | Melt Viscosity 380° C. (kNsm$^{-2}$) |
|---|---|---|---|---|---|---|---|
| 16a | 40[a] | 0 | 60 | 0 | 74 | 7.8 | 0.51 |
| 16b | 37.9[a] | 3 | 59.1 | 5.25 | 57 | 7.4 | 0.29 |
| 16c | 35.8[a] | 6 | 58.2 | 10.5 | 50 | 5.5 | 0.26 |
| 16d | 33.7[a] | 9 | 57.3 | 15.75 | 50 | 5.3 | 0.23 |
| 16e | 31.6[a] | 12 | 56.4 | 21 | 50 | 5.1 | 0.21 |
| 16f | 70[b] | 0 | 30 | 0 | 65 | 8.5 | 0.33 |
| 16g | 66.5[b] | 5 | 28.5 | 5 | 45 | 9.5 | 0.30 |
| 16h | 63[b] | 10 | 27 | 10 | 39 | 9.6 | 0.20 |
| 16i | 59.5[b] | 15 | 25.5 | 15 | 34 | 9.1 | 0.19 |

[a]PEEK sample Blend 3e(64 wt %) + 3a(36 wt %)
[b]Victrex PEEK 150P

TABLE 12b

| Example | Tensile Strength (MPa)[a] | Flexural Strength (MPa)[b] | Flexural Modulus (GPa)[b] | Notched Izod kJ/m$^2$[c] | Unnotched Izod kJ/m$^2$[c] |
|---|---|---|---|---|---|
| 16a | 230 | 342 | 20.6 | 10.5 | 50.1 |
| 16b | 234 | 349 | 21.2 | 14.0 | 52.9 |
| 16c | 235 | 340 | 21.3 | 12.8 | 48.9 |
| 16d | 212 | 323 | 21.3 | 12.5 | 45.6 |
| 16e | 216 | 325 | 21.2 | 12.4 | 45.8 |
| 16f | 174 | 265 | 9.8 | 9.1 | 60.4 |
| 16g | 168 | 232 | 10.1 | 8.6 | 43.3 |
| 16h | 163 | 231 | 10.4 | 7.3 | 38.6 |
| 16i | 156 | 221 | 10.6 | 7.5 | 40.0 |

[a]ISO 527
[b]ISO 178-1993(E)
[c]ISO 180

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of making a composite material which comprises a polymeric material of a type which includes:
   (a) phenyl moieties;
   (b) ketone moieties; and
   (c) ether moieties;
   and a filler means wherein said polymeric material has en MV in the range 0.07 to 0.11 kNsm$^{-2}$ and wherein said filler means comprises a discontinuous fibrous filler or a non-fibrous filler, the method comprising:
   (i) selecting said polymeric material having an MV in the range 0.07 to 0.11 kNsm$^{-2}$, wherein said polymeric material is of a type which includes:
   (a) phenyl moieties;
   (b) ketone moieties; and
   (c) ether moieties;
   AND
   (ii) contacting said polymeric material with a filler means to prepare said composite material.

2. A method according to claim 1, which comprises extruding said polymeric material and filler means and subsequently forming pellets or granules from extruded material thereby to prepare pellets or granules of said composite material.

3. A method of making a component, the method comprising extruding or injection moulding a polymeric material having an MV in the range 0.07 to 0.11 kNsm$^{-2}$, wherein said polymeric material is of a type which includes:
(a) phenyl moieties;
(b) ketone moieties; and
(c) ether moieties.

4. A method according to claim 3, which includes selecting a precursor material from which to make a component wherein said precursor material comprises a said polymeric material and subjecting the precursor material to a temperature above its melting temperature in an extrusion or injection moulding apparatus.

5. A method of making a component according to claim 4, wherein said component has a wall which includes a region having a thickness of 3 mm or less.

6. A method according to claim 3, wherein said polymeric material comprises polyatheretherketone having an MV in the range 0.085 to 0.095 kNsm$^{-2}$ when measured at a shear rate of 1000s$^{-1}$.

7. A method according to claim 3, the method comprising extruding or injection moulding a composite material which comprises said polymeric material, wherein said composite material comprises:
polyetheretherketone having an MV in the range 0.085 to 0.095 kNsm$^{-2}$ when measured at a shear rate of 1000s$^{-1}$;
a filler means comprising a discontinuous fibrous filler or a non-fibrous filler;
wherein the ratio of the wt % of polyatheretherketone to the wt % of filler means in said composite material is at least 1.

8. A method according to claim 7, which comprises selecting pellets or granules comprising said composite material and subjecting said pellets or granules to an extrusion or injection moulding process whereby said component is made.

9. A method according to claim 1, wherein said polymeric material is selected from the group comprising polyetheretherketone, polyetherketone, polyetherketoneketone, polyetherketoneetherketoneketone, polyetheretherketoneketone, polyether-diphenyl-ether-phenyl-ketone-phenyl-.

10. A method according to claim 1, wherein said polymeric material comprises polyetheretherketone.

11. A method according to claim 1, wherein said polymeric material selected in step (i) and the composite material prepared in step (ii) comprise said polymeric material having an MV in the range 0.08 to 0.11 kNsm$^{-2}$.

12. A method according to claim 9, wherein said polymeric material selected in step (i) and the composite material prepared in step (ii) comprise said polymeric material having an MV in the range 0.085 to 0.095 kNsm$^{-2}$.

13. A method according to claim 9, wherein said discontinuous fibrous filler comprises fibres having an average length of less than 10 mm.

14. A method according to claim 9, wherein said filler means comprises one or more fillers selected from discontinuous glass fibre, discontinuous carbon fibre, carbon black and a fluorocarbon resin.

15. A method according to claim 9, wherein said composite material comprises 40 to 65 wt % of polymeric material and 35 to 60 wt % of filler means.

16. A method according to claim 9, wherein said composite material comprising 40 to 60 wt % of polymeric material and 40 to 60 wt % of filler means.

17. A method according to claim 9, wherein the ratio of the wt % of polymeric material to the wt % of the filler means in said composite material is at least 1.

18. A method according to claim 9, wherein said composite material includes 50 wt % or more of said filler means.

19. A method according to claim 9, wherein said composite material includes 55 wt % or more of said filler means.

20. A method according to claim 9, wherein said polymeric material comprises polyetheretherketone having an MV in the range 0.086 to 0.096 kNsm$^{-2}$ when measured at a shear rate of 1000s$^{-1}$;
said filler means is selected from discontinuous glass fibre, discontinuous carbon fibre, carbon black and a fluorocarbon resin; and
the ratio of the wt % of filler means to the wt % of polymeric material in said composite material is at least 1.

21. A method according to claim 9, wherein said polymeric material comprise polyetheretherketone having an MV in the range 0.085 to 0.095 kNsm$^{-2}$ when measured at a shear rate of 1000s$^{-1}$; said filler means comprises a discontinuous fibrous filler or a non-fibrous filler;
said composite material comprises 40 to 60 wt % of said polymeric material and 40 to 60 wt % of said filler means.

22. A method according to claim 9, wherein said polymeric material in said composite material has a level of crystallinity of at least 10%.

23. A method according to claim 9, wherein said polymeric material in said composite material has a level of crystallinity of at least 30%.

24. A method according to claim 3, wherein said component comprises a polymeric material which is selected from the group comprising polyetheretherketone, polyetherketone, polyetherketoneketone, polyetherketoneetherketoneketone, polyetheretherketoneketone, polyether-diphenyl-ether-phenyl-ketone-phenyl- and has an MV in the range 0.07 to 0.11 kNsm$^{-2}$ and said method comprises:
(i) selecting a precursor material from which to make said component, wherein said precursor material is selected from the group comprising polyetheretherketone, polyetherketone, polyetherketoneketone, polyetherketoneetherketoneketone, polyetheretherketoneketone, polyether-diphenyl-ether-phenylaketone-phenyl- having an MV in the range 0.07 to 0.11 kNsm$^{-2}$; and
(ii) subjecting said precursor material to a temperature above its melting temperature in an extrusion or injection moulding apparatus.

25. A method according to claim 24, wherein said polymeric material comprises polyetheretherketone.

26. A method according to claim 24, wherein said precursor material selected in step (i) arid the component made in the method comprise said polymeric material having an MV in the range 0.08 to 0.11 kNsm$^{-2}$.

27. A method according to claim 24, wherein said precursor material selected in step (i) and the component made in the method comprise said polymeric material having an MV in the range 0.085 to 0.95 kNsm$^{-2}$.

28. A method according to claim 24, wherein said component comprises a polymeric material having a level of crystallinity of at least 10%.

29. A method according to claim 24, wherein said component comprises a polymeric material having a level of crystallinity of at least 30%.

30. A method according to claim 24, the method comprising extruding or injection moulding a composite material which comprises said polymeric material, wherein said composite material comprises:
(i) a polymeric material which is selected from the group comprising polyetheretherketone, polyotherketone, polyetherketoneketone, polyetherketoneetherketoneketone, polyetheretherketoneketone, polyether-diphenylether-phenyl-ketone-phenyl- and having an MV in the range 0.07 to 0.11 $kNsm^{-2}$; and (ii) a filler means comprising a discontinuous fibrous filler or a non-fibrous filler.

31. A method according to claim 30, wherein said discontinuous fibrous filler comprises fibres having en average length of less than 10 mm.

32. A method according to claim 31, wherein said filler means comprises one or more fillers selected from discontinuous glass fibre, discontinuous carbon fibre, carbon black and a fluorocarbon resin.

33. A method according to claim 31, wherein said composite material comprises 40 to 65 wt % of polymeric material and 35 to 60 wt % of filler means.

34. A method according to claim 32, wherein said composite material comprising 40 to 60 wt % of polymeric material and 40 to 60 wt % of filler means.

35. A method according to claim 31, wherein the ratio of the wt % of polymeric material to the wt % of the filler means is at least 1.

36. A method according to claim 30, wherein said composite material includes 50 wt % or more of filler means.

37. A method according to claim 31, wherein said composite material includes 55 wt % or more filler means.

38. A method of making a composite material which comprises polyetheretherketone having an MV in the range 0.08 to 0.10 $kNsm^{-2}$ and a filler means comprising a discontinuous fibrous filler or a non-fibrous filler, the method comprising:

(i) selecting a polyetheretherketone having an MV in the range 0.08 to 0.10 $kNsm^{-2}$;

AND (ii) contacting said polyetheretherketofle with said filler means comprising said, discontinuous fibrous filler or said non-fibrous filler.

39. A method of making a component comprising polyetheretherketone having an MV in the range 0.08 to 0.10 $kNsm^{-2}$, the method comprising:

(i) selecting a precursor material from which to make said component, wherein said precursor material comprises polyetheretherketone having an MV in the range 0.08 to 0.10 $kNsm^{-2}$; and (ii) subjecting said precursor material to a temperature above its melting temperature in an extrusion or injection moulding apparatus.

40. A method according to claim 39, wherein said precursor material consists essentially of polyetheretherketone.

41. A method of making a component comprising polyetheretherketone having an MV in the range 0.08 to 0.10 $kNsm^{-2}$, the method comprising:

(i) selecting a precursor material from which to make said component, wherein said precursor material consists essentially of polyetheretherketone having an MV in the range 0.08 to 0.10 $kNsm^{-2}$; and (ii) subjecting said precursor material to a temperature above its melting temperature in an extrusion or injection moulding apparatus.

* * * * *